2,967,753
BLUE DISPERSE-DYESTUFFS OF THE ANTHRAQUINONE SERIES

Peter Bitterli and Jacques Guenthard, Basel, Switzerland, assignors to Sandoz Ltd., Basel, Switzerland No Drawing. Filed June 12, 1959, Ser. No. 819,804
Claims priority, application Switzerland June 16, 1958
6 Claims. (Cl. 8—25)

This invention relates to blue disperse dyestuffs of the anthraquinone series which have the formula

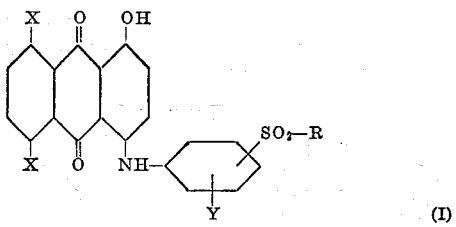

(I)

wherein one X stands for the hydroxy group and the other X for the group

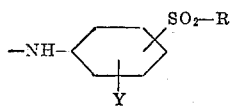

R for an alkyl radical which may be further substituted and Y for hydrogen, methyl, methoxy or chlorine, and the group —$SO_2$—R is in meta- or para-position to the —NH— group.

The process for their production consists (a) in reacting 1 mole of 1.5-dihydroxy-4.8-dinitroanthraquinone or 1.8-dihydroxy-4.5-dinitroanthraquinone or a mixture of these with at least 2 moles of an amine of the formula

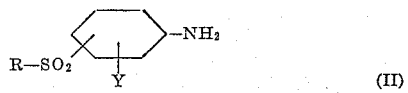

(II)

wherein R and Y possess the aforecited meanings and the group R—$SO_2$— is in meta- or para-position to the amino group, or (b) in condensing 1 mole of 1.5-dihydroxy - 4.8 - dinitroanthraquinone or 1.8 - dihydroxy-4.5-dinitroanthraquinone or a mixture of these with at least 2 moles of an amine of the formula

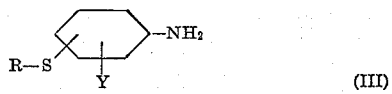

(III)

wherein R and Y possess the aforecited meanings and the R—S— group is in meta- or para-position to the amino group, with subsequent oxidation of the R—S— group in the resulting condensation product to the —R—$SO_2$— group.

The substituent R is preferably a low molecular alkyl (methyl, ethyl), hydroxyalkyl (hydroxyethyl, hydroxypropyl, dihydroxypropyl, hydroxychloropropyl), alkoxyalkyl or alkoxy alkoxyalkyl (ethoxyethyl, methoxyethoxyethyl, methoxybutyl, methoxypropyl).

The reaction of the dihydroxy-dinitroanthraquinones of the above definition with the amines of Formulae II and III is conducted preferably in an inert organic solvent, e.g. chlorobenzene, dichlorobenzene, nitrobenzene, methyl diethylene glycol, and at higher temperatures, preferably above 120° C. The pressure may be atmospheric or higher than atmospheric, in which latter case solvents can be used whose boiling point lies below or just above 100° C., e.g. benzene or toluene.

The course of the reaction can be controlled by chromatographic absorption on a talc column. Condensation is continued until both nitro groups have been replaced by radicals of arylamines of the Formula II or III. The monocondensation product is visible in the violet zone and the dicondensation product in the blue zone. The reaction products can be isolated by e.g. precipitation with a suitable agent, evaporation to a small volume under reduced pressure, or removal of the solvent by stream distillation and filtering with suction the precipitated dyestuff or intermediate product.

In the dyestuff intermediates of the formula

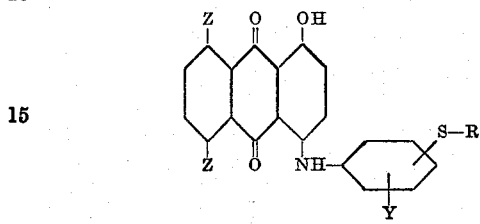

wherein one Z stands for the hydroxy group and the other Z for the group

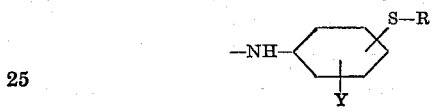

and wherein R and Y have the aforestated meanings and the R—S— group is in meta- or para-position to the —NH— group, the oxidation of the R—S— group to the R—$SO_2$— group is carried out preferably in glacial acetic acid or in concentrated acetic acid, the optimum temperature range being 20 to 90° C. The best oxidizing agents are hydrogen peroxide and chromic acid.

In general the dyestuffs obtained possess good solubility in standard organic solvents. On conversion into a finely divided state, e.g. by grinding in aqueous suspension in presence of a suitable dispersing agent, such as sodium dinaphthylmethane-disulfonate or sodium ligninsulfonate, they are eminently suitable for dyeing and printing fibers of cellulose esters and ethers, linear aromatic polyester, polyamide, polyurethane and polyvinyl ester fibers, and for the mass coloration of molded goods of these materials. The dyeings produced on cellulose acetate possess good fastness to light, washing, water, perspiration, gas fumes, rubbing, formaldehyde, decatizing and dry cleaning. The dyeings on cellulose triacetate and on linear aromatic polyester fibers are fast to light, washing, perspiration, sublimation and heat setting. Cotton and viscose present in the dyebath are well reserved.

In the following examples the parts and percentages are by weight and the temperatures in degrees centigrade.

Example 1

10 parts of 3-methylsulfonyl-1-aminobenzene and 6 parts of 1.8 - dihydroxy - 4.5 - dinitroanthraquinone are heated in 100 parts of nitrobenzene for 16 hours at 200° with stirring. After the addition of 20 parts of concentrated hydrochloric acid the nitrobenzene is distilled off with steam. On cooling the residue is filtered off and washed until of neutral reaction. It is stirred with 500 parts of a 1% sodium carbonate solution at 70°, filtered with suction and washed until neutral. A dyestuff is obtained which, dispersed by the normal methods, dyes cellulose acetate blue. The dyeings possess very good fastness to light and gas fumes.

When the 3-methylsulfonyl - 1 - aminobenzene is replaced by an equal amount of 4-methylsulfonyl-1-aminobenzene, an analogous dyestuff with the same fastness properties is obtained.

1 part of the above dyestuff, 1 part of the sodium salt of dinaphthylmethanedisulfonic acid and 8 parts of water are ground until a fine dispersion is obtained. This is run into 3000 parts of water and 6 parts of Marseilles soap. In this dyebath 100 parts of a fabric of acetate is entered. The temperature is increased to 80° in 30 minutes and this temperature maintained for a further hour. The dyed fabric is then removed, rinsed and dried. It is dyed to a blue shade of excellent fastness to light, washing, gas fumes, sublimation and pleating. Blue dyeings with excellent fastness properties are also obtained on fabrics and fibers of linear aromatic polyesters from dyebaths of the same composition at a temperature of 98° and in presence of a suitable carrier.

*Example 2*

10 parts of 3-methylsulfonyl - 1 - aminobenzene and 6 parts of 1.5 - dihydroxy - 4.8 - dinitroanthraquinone are heated with stirring in 50 parts of 1.2-dichlorobenzene for 16 hours at 160°. On cooling the reaction mass is diluted with 200 parts of ethyl alcohol. The precipitated product is filtered off and washed with ethyl alcohol until the filtrate is of a clear blue color.

The dyestuff is applied to acetate from an aqueous dispersion to give blue shades which are very fast to light and gas fumes. When the 3-methylsulfonyl-1-aminobenzene is replaced by an equal amount of 4-methylsulfonyl - 1 - aminobenzene an analogous dyestuff with good fastness properties is obtained.

*Example 3*

When the 1.8 - dihydroxy - 4.5 - dinitroanthraquinone of Example 1 is replaced by a mixture of 3 parts of 1.8-dihydroxy-4.5-dinitroanthraquinone and 3 parts of 1.5-dihydroxy - 4.8 - dinitroanthraquinone, a dyestuff is obtained which has better affinity for cellulose 2½-acetate and gives dyeings with the same good fastness properties as those of the dyestuffs of Examples 1 and 2.

*Example 4*

When the amines named in Examples 1 and 3 are replaced by the equivalent amount of one of the following amines: 3- or 4 - ethylsulfonyl - 1 - aminobenzene, 4-ethoxyethylsulfonyl - 1 - aminobenzene, 4 - methyl - 3-methylsulfonyl - 1 - aminobenzene or 4 - methyl - 3-ethylsulfonyl - 1 - aminobenzene, analogous dyestuffs with similar fastness properties are obtained.

*Example 5*

13 parts of 3-(2' - hydroxy) - ethylthio - 1 - aminobenzene, 8 parts of 1.8-dihydroxy-4.5-dinitroanthraquinone and 90 parts of methyldiethyleneglycol are stirred for 20 hours at 130°. The reaction mixture is run into 500 parts of water containing 20 parts of concentrated hydrochloric acid. The precipitated dyestuff is filtered with suction and washed until neutral. It is then stirred for 30 minutes at 60° with 500 parts of a 1% sodium carbonate solution to free it from brown byproducts. 3 parts of the dyestuff thus obtained are dissolved in 30 parts of glacial acetic acid at 90°. 2.8 parts of a 30% hydrogen peroxide solution are added and the solution stirred for 2 hours at 90°. The reaction mixture is then run into 500 parts of water. The precipitated dyestuff dyes cellulose 2½-acetate from aqueous dispersion in reddish blue shades which are very fast to light and gas fumes.

When the 1.8-dihydroxy-4.5-dinitroanthraquinone is replaced by an equal amount of 1.5-dihydroxy-4.8-dinitroanthraquinone, an analogous dye with the same fastness properties is obtained.

*Example 6*

The procedure is the same as that described in Example 5 except that oxidation is carried out with chromic acid: 3 parts of the intermediate product are added to 30 parts of glacial acetic acid and at 20° a solution of 3 parts of chromium trioxide in 20 parts of glacial acetic acid is slowly added. Stirring is continued for 16 hours at 20° and the whole is then run into 500 parts of water containing 10 parts of concentrated sulfuric acid. The precipitated dyestuff is filtered with suction and washed until of neutral reaction. It is identical with the dyestuff described in Example 5.

*Example 7*

13 parts of 4-(2'-hydroxy)-ethylthio-1-aminobenzene, 8 parts of 1,5-dihydroxy-4.8-dinitroanthraquinone and 80 parts of chlorobenzene are stirred for 20 hours at 130°. After the addition of 20 parts of concentrated hydrochloric acid the chlorobenzene is distilled off with steam, the residue filtered off and washed until neutral. It is stirred with 500 parts of a 1% sodium carbonate solution at 60°, filtered with suction and washed with hot water until neutral.

3 parts of the dyestuff formed are dissolved in 30 parts of glacial acetic acid at 90° and oxidized by stirring with 2.8 parts of a 30% hydrogen peroxide solution for 2 hours at 90°. The dyestuff dyes cellulose 2½-acetate in blue shades fast to light and gas fumes.

*Example 8*

50 parts of a mixture of 1.5-dihydroxy-4.8-dinitroanthraquinone and 1.8-dihydroxy-4.5-dinitroanthraquinone are mixed with 70 parts of 3-(2'-hydroxy)-ethylthio-1-aminobenzene in 300 parts of methyldiethylene glycol for 20 hours at 120–130°. The reaction mass is run into a mixture of 500 parts of ice, 2000 parts of water and 50 parts of 30% hydrochloric acid. The precipitated dyestuff is filtered with suction, washed until neutral and stirred into 1000 parts of a 1% sodium hydroxide solution. After stirring for 16 hours at room temperature the intermediate product is filtered with suction, washed until neutral and dried. To oxidise the product it is dissolved in 500 parts of glacial acetic acid at 90°, to which are added dropwise 40 parts of 30% hydrogen peroxide. After 2 hours' stirring the reaction mass is poured into a mixture of 1500 parts of water and 50 parts of 30% hydrochloric acid. The dyestuff is filtered with suction, washed until neutral, and dried. The dyestuff dyes cellulose 2½-acetate in blue shades which are fast to light and gas fumes.

The mixture of dihydroxy-dinitroanthraquinones is obtained as follows: the isomeric mixture of anthraquinone-1.5- and -1.8-disulfonic acid, obtained by disulfonation of anthraquinone after separation of the accompanying 1.6- and 1.7-isomers, is converted into the 1.5- and 1.8-dichloroanthraquinones by chlorination with sodium chlorate and hydrocholoric acid, and these anthraquinones then reacted with sodium phenolate to give 1.5- and 1.8-diphenoxyanthraquinones. Upon nitration and alkaline saponification the mixture of 1.5-dihydroxy-4.8-dinitroanthraquinone and 1.8-dihydroxy-4.5-dinitroanthraquinone is obtained.

*Example 9*

When the 3-(2'-hydroxy)-ethylthio-1-aminobenzene used in Examples 5, 6 and 8 is replaced by the equivalent amount of one of the following amines, analogous dyestuffs with similar fastness properties are obtained.

| Amine | Shade on Acetate |
|---|---|
| 3-methylthio-1-aminobenzene | blue. |
| 4-methylthio-1-aminobenzene | Do. |
| 3-ethylthio-1-aminobenzene | Do. |
| 4-ethylthio-1-aminobenzene | Do. |
| 3-(2'.3'-dihydroxy)-propylthio-1-aminobenzene | reddish blue. |
| 4-(2'.3'-dihydroxy)-propylthio-1-aminobenzene | Do. |
| 3-(2'-ethoxy)-ethylthio-1-aminobenzene | blue. |
| 4-(2'-ethoxy)-ethylthio-1-aminobenzene | Do. |
| 4-[2'-(2''-methoxy)-ethoxy]-ethylthio-1-aminobenzene | Do. |
| 3-(2'-hydroxy-3'-chloro)-propylthio-1-aminobenzene | reddish blue. |
| 4-(2'-hydroxy-3'-chloro)-propylthio-1-aminobenzene | Do. |
| 4-methyl-3-(2'-hydroxy)-ethylthio-1-aminobenzene | blue. |
| 3-(3'-methoxy)-propylthio-1-aminobenzene | Do. |
| 3-[2'-(2''-ethoxy)-ethoxy]-ethylthio-1-aminobenzene | Do. |
| 3-n-propylthio-1-aminobenzene | Do. |
| 3-(3'-hydroxy)-propylthio-1-aminobenzene | Do. |

Formulae of representative dyestuffs of the foregoing examples are as follows:

*Example 1*

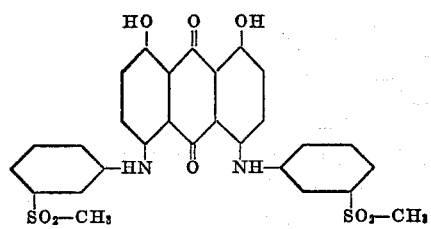

*Example 2 (first paragraph)*

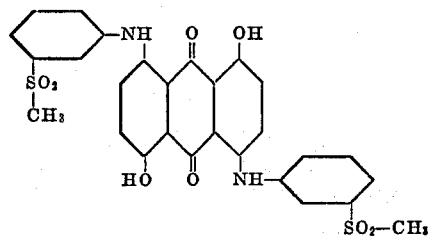

*Example 2 (second paragraph)*

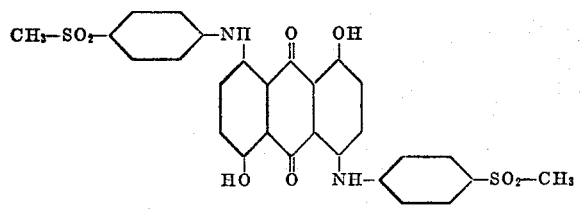

*Example 3*

The dyestuffs of Example 3 represent a mixture of the dyestuffs of Examples 1 and 2 (first paragraph).

*Example 5 (first paragraph)*

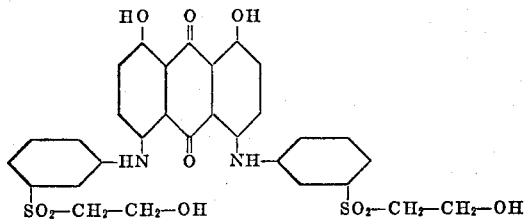

*Example 5 (second paragraph)*

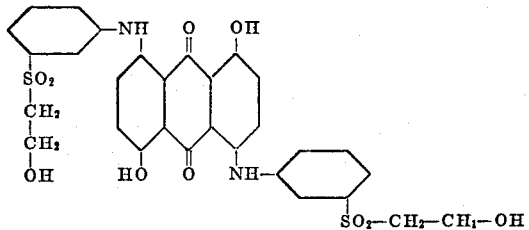

*Example 7*

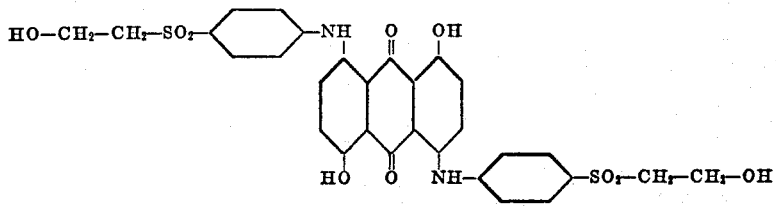

*Example 8*

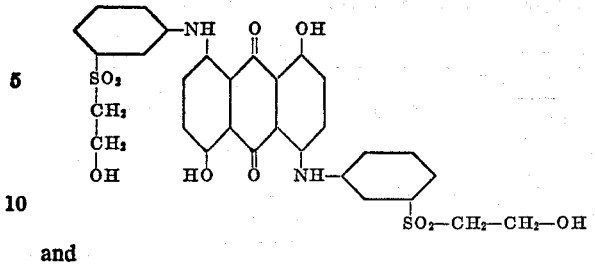

and

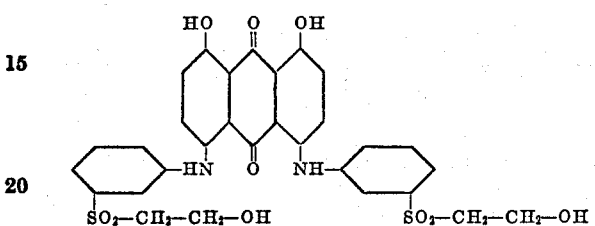

*Example 9*

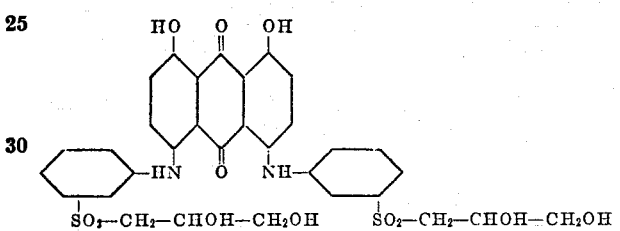

Having thus disclosed the invention what we claim is:
1. Blue disperse dyestuffs of the anthraquinone series which have the formula

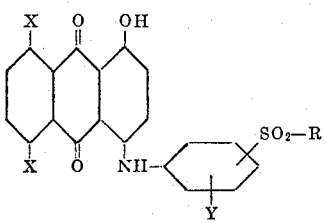

wherein one X represents the hydroxy group and the other X represents the group

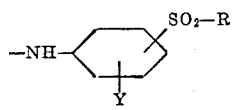

R represents a member selected from the group consisting of lower alkyl, lower alkoxyalkyl, lower alkoxyalkoxyalkyl, lower hydroxyalkyl and lower chlorohydroxyalkyl, Y represents a member selected from the group consisting of hydrogen and methyl, and the group —SO$_2$—R stands in one of the meta- and para-positions to the —NH— group.

2. The blue disperse dyestuff of the anthraquinone series which has the formula

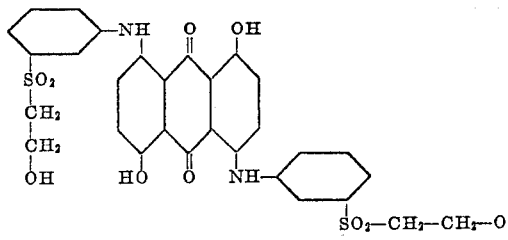

3. The blue disperse dyestuff of the anthraquinone series which has the formula

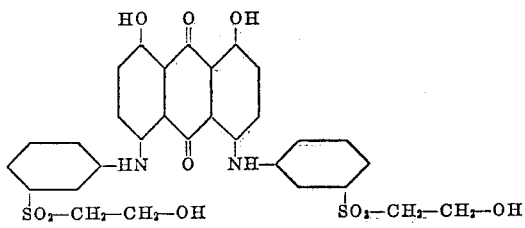

4. The mixture of blue disperse dyestuffs of the anthraquinone series which have the formulae

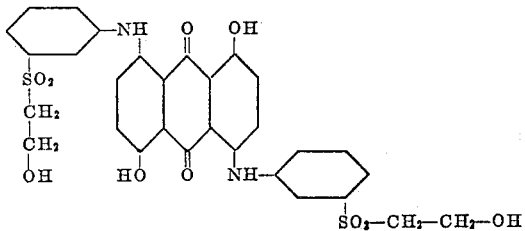

and

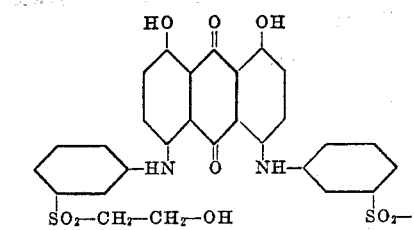

5. The blue disperse dyestuff of the anthraquinone series which has the formula

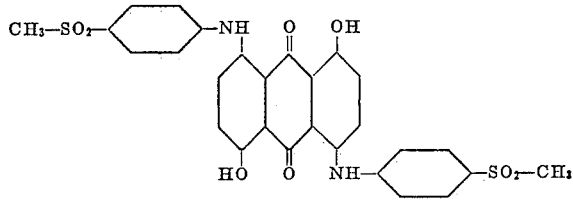

6. The blue disperse dyestuff of the anthraquinone series which has the formula

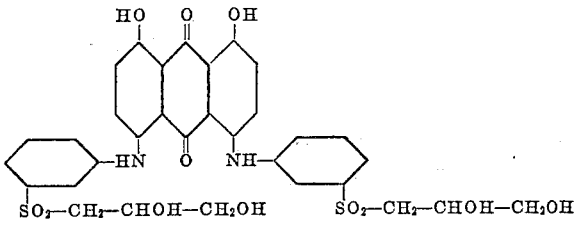

References Cited in the file of this patent

UNITED STATES PATENTS

| | | |
|---|---|---|
| 603,659 | Schmidt | May 10, 1898 |
| 1,935,929 | Zahn | Nov. 21, 1933 |
| 2,485,197 | Grossmann | Oct. 18, 1949 |
| 2,731,476 | Peter | Jan. 17, 1956 |